(12) United States Patent
Boudreau

(10) Patent No.: US 7,757,839 B2
(45) Date of Patent: Jul. 20, 2010

(54) SLIDES FOR ENDLESS BELT CONVEYORS

(75) Inventor: Jean-Marc Boudreau, Bathurst (CA)

(73) Assignee: Canglide Inc., Bathrust, New Brunswick (CA)

( * ) Notice: Subject to any disclaimer, the term of this patent is extended or adjusted under 35 U.S.C. 154(b) by 0 days.

(21) Appl. No.: 12/466,812

(22) Filed: May 15, 2009

(65) Prior Publication Data

US 2009/0277757 A1 Nov. 12, 2009

Related U.S. Application Data

(62) Division of application No. 11/600,887, filed on Nov. 17, 2006, now abandoned.

(30) Foreign Application Priority Data

Nov. 17, 2005 (CA) ................................. 2527295
Jul. 14, 2006 (CA) ................................. 2552065

(51) Int. Cl.
*B65G 15/08* (2006.01)
*B65G 17/00* (2006.01)
*B65G 15/60* (2006.01)
*B65G 17/10* (2006.01)
*B65G 39/10* (2006.01)
*B65G 45/02* (2006.01)

(52) U.S. Cl. ................ 198/823; 198/841; 198/839; 198/822; 198/830; 198/501

(58) Field of Classification Search ............ 198/841, 198/839, 822, 830
See application file for complete search history.

(56) References Cited

U.S. PATENT DOCUMENTS

| | | | |
|---|---|---|---|
| 3,929,179 A | 12/1975 | Hines | |
| 3,993,185 A * | 11/1976 | Fleckenstein et al. | ....... 198/813 |
| 4,018,329 A | 4/1977 | Jarvis | |
| 4,215,776 A | 8/1980 | Esler | |
| 4,280,619 A | 7/1981 | Ward et al. | |
| 4,919,253 A * | 4/1990 | Morrison | ..................... 198/501 |
| 4,944,385 A | 7/1990 | Shelby | |
| 4,951,809 A | 8/1990 | Boothe et al. | |
| 5,007,528 A | 4/1991 | Hideharu | |
| 5,031,757 A | 7/1991 | Draebel et al. | |
| 5,038,924 A | 8/1991 | Stoll | |
| 5,350,053 A | 9/1994 | Archer | |
| 5,584,767 A | 12/1996 | Picchietti et al. | |
| 5,601,180 A | 2/1997 | Steeber et al. | |
| 5,799,780 A * | 9/1998 | Steeb et al. | ................. 198/823 |
| 5,826,703 A | 10/1998 | Altemus, Jr. et al. | |
| 5,927,478 A | 7/1999 | Archer | |
| 5,988,360 A | 11/1999 | Mott | |
| 6,237,753 B1 | 5/2001 | Walter et al. | |

(Continued)

FOREIGN PATENT DOCUMENTS

CA 2327646 6/2002

(Continued)

*Primary Examiner*—Gene Crawford
*Assistant Examiner*—Yolanda Cumbess
(74) *Attorney, Agent, or Firm*—Eugene F. Derényi; Stikeman Elliott LLP

(57) ABSTRACT

Slides for use on an endless belt conveyor belt and wear pads for use on slides for endless belt conveyors.

3 Claims, 8 Drawing Sheets

U.S. PATENT DOCUMENTS 6,349,817 B1 2/2002 Wadensten
6,854,593 B2 2/2005 Boudreau

FOREIGN PATENT DOCUMENTS

| CA | 2517766 | 2/2007 |
|----|---------|--------|
| CA | 2552065 | 1/2008 |
| EP | 0406425 A1 | 1/1991 |

* cited by examiner

SLIDES FOR ENDLESS BELT CONVEYORS

CROSS-REFERENCE TO RELATED APPLICATIONS

This application is a divisional of U.S. patent application Ser. No. 11/600,887 filed on Nov. 17, 2006, the contents of which are hereby incorporated by reference.

BACKGROUND OF THE INVENTION

1. Field of the Invention

This invention relates to slides for endless belt conveyors and wear pads for use on slides for endless belt conveyors.

2. Discussion of the Prior Art

Slides, which have been referred to as idlers have been used for some time to support conveyor belts. For example, U.S. Pat. No. 6,854,593 issued to Boudreau et al on Feb. 15, 2005, discloses a slide referred to as a pad-type idler, for slidably supporting a continuous conveyor belt. The pad-type idlers are supported on a metal support above a base. When conveying a liquid-containing substance, e.g. in the food processing industry, liquid falls onto the slides where it accumulates. The presence of a liquid between the belt and the slides results in drag (skin friction drag) between the belt and the slides which causes the belt to slow down or stop.

U.S. Pat. No. 5,799,780 issued to Steeb et al (hereinafter Steeb) on Sep. 1, 1998, discloses a slide, referred to therein as a wear bar, for slidably supporting a continuous conveyor belt. The first embodiment of Steeb is a feed idler assembly, which includes a generally U-shaped frame defined by a base, a pair of legs on opposite ends of the base and a pair of shorter intermediate supports between the legs. Plates are attached to the top ends of the legs of the intermediate supports. Wear bars are attached to the tops of the plates. A conveyor belt sliding over the wear bars forms a trough which is useful for conveying materials in the manufacturing and mining industries.

The fixed wear bars of Steeb are intended to replace rotatable idler rollers. The Steeb patent discloses two different types of wear bars, namely those used for a feed idler assembly (see FIGS. 8a to 8c in particular) and one for a return idler assembly (see FIGS. 11a to 11c). The feed idler wear bar has a flat top surface and tapered side surfaces. The return idler is a flat plate. The Steeb return idlers cause the edges of the conveyor belt to wear, because the belt has a slightly bowed profile upon its return and accordingly contacts the edges of the return idlers.

GENERAL DESCRIPTION OF THE INVENTION

In one aspect, the invention relates to a wear pad for use on a slide of an endless track conveyor belt comprising an elongated body having a flat top surface for slidably supporting a conveyor belt during travel of the belt over the top surface between leading and trailing edges of the top surface; and a plurality of grooves in said top surface extending between the leading and trailing edges of the body for discharging liquid falling onto the top surface, whereby drag between the wear pad and the belt is reduced.

In another aspect, the invention relates to a slide for use on an endless belt conveyor, said slide comprising a crossbar extending perpendicular to the path of travel of the endless belt; and a wear pad on said crossbar for supporting said belt during travel of the belt, said wear pad extending perpendicular to said path of travel; a spacer between said pad and said crossbar for spacing said pad from said crossbar; and retaining means for retaining said pad and spacer on said crossbar.

In another aspect, the invention relates to a slide for use on an endless belt conveyor, said slide comprising a crossbar extending perpendicular to the path of travel of the endless belt; the top of said crossbar having a hole therethrough; a wear pad on said crossbar for supporting said belt during travel of the belt, said wear pad extending perpendicular to said path of travel and having a threaded hole therethrough, a synthetic fluorine-containing resin bolt in said threaded hole extending through said hole in said crossbar; and locking means for retaining said pad on said crossbar.

In another aspect, the invention relates to a return slide for use on an endless belt conveyor, which includes a pair of rollers and an endless belt extending around said rollers, said slide comprising a base for extending perpendicular to the path of travel of the endless belt beneath said rollers; and a wear pad on said base for supporting said belt during travel of the belt beneath said rollers, said wear pad having a top surface which is convex along its length for positioning beneath an endless belt with the pad extending perpendicular to said path of travel.

In another aspect, the invention relates to a hanger assembly used for suspending a return slide from an endless belt conveyor frame comprising a hanger plate having a top end for suspending the hanger from the conveyor frame; a bottom end for supporting one end of a return slide; a keyhole slot in said bottom end for receiving a bar for connecting the hanger plate to one end of a return slide; and a clip for locking said bar in said slot.

In another aspect, the invention relates to a hanger assembly used for suspending a return slide from an endless belt conveyor frame comprising a hanger plate having a vertical top end portion; a flange on said top end portion for suspending the hanger from the conveyor frame; a web connected at one end to a lower end of said top portion for extending inwardly towards one end of a conveyor slide; a vertical bottom end portion connected to a second end of said web, a keyhole slot in said bottom end portion for receiving a bar for connecting the hanger plate to one end of a return slide; and a clip for locking said bar in said slot.

BRIEF DESCRIPTION OF THE DRAWINGS

The invention is described below in greater detail with reference to the accompanying drawings, wherein.

DESCRIPTION OF THE PREFERRED EMBODIMENTS

Figure 1:
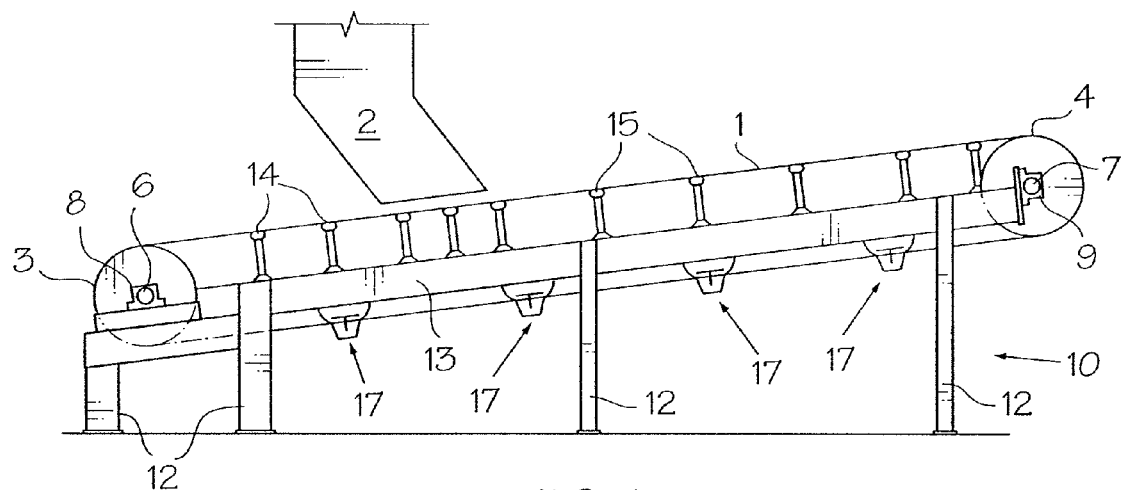
FIG. 1 is a schematic side view of an endless belt conveyor of the type which can employ a wear pad and a slide in accordance with the invention.
Figure 2:
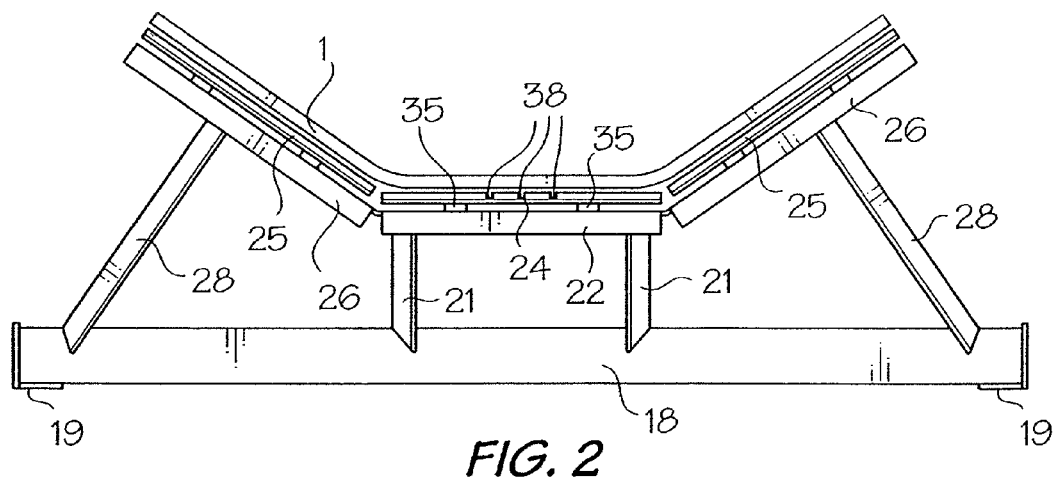
FIG. 2 is a front view of a slide assembly incorporating a wear pad in accordance with the invention.
Figure 3:
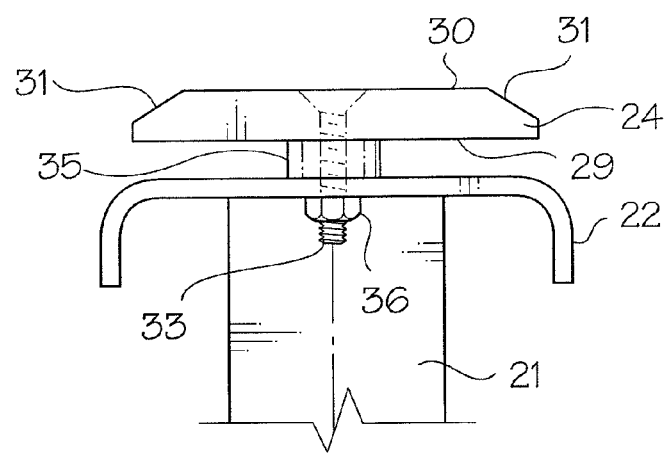
FIG. 3 is an end view of the wear pad of FIG. 2 mounted on a crossbar of the slide assembly of FIG. 2.
Figure 4:
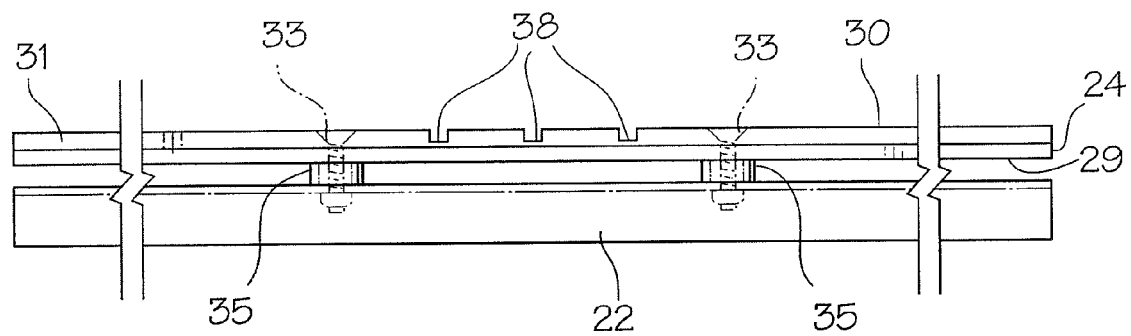
FIG. 4 is a front view of the wear pad and crossbar of FIG. 3.
Figure 5:
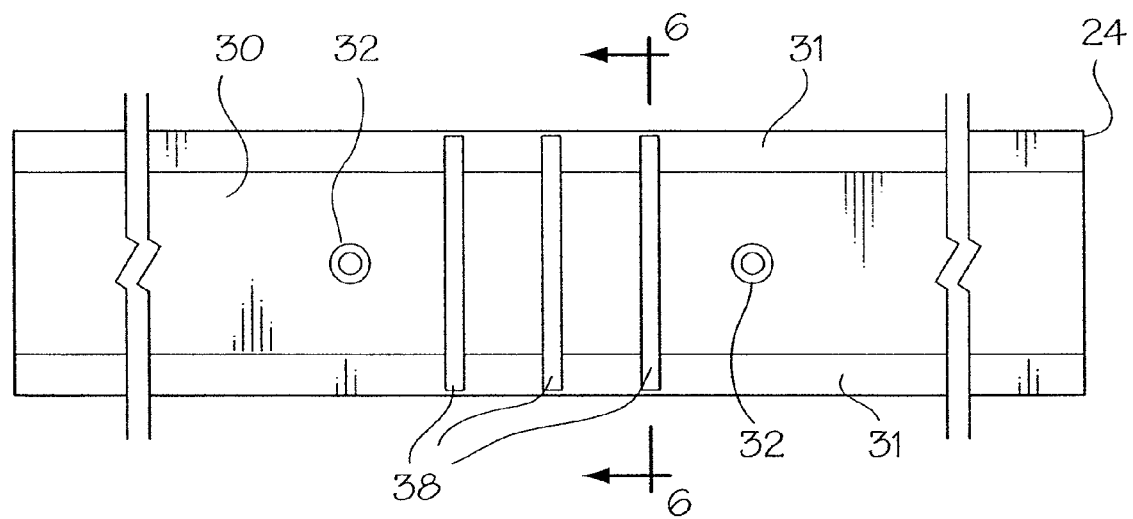
FIG. 5 is a top view of the wear pad of FIGS. 3 and 4.
Figure 6:
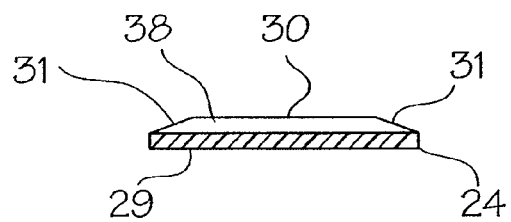
FIG. 6 is a cross section taken generally along line 6-6 of FIG. 5.

Referring to FIG. 1, the slides and wear pads of the present invention are intended for use in a conveyor assembly of the type including an inclined endless belt for receiving material to be conveyed from a chute 2 located above the belt. The belt 1 passes around a tail pulley 3 and a driven head pulley 4. The pulleys 3 and 4 include axles 6 and 7 mounted in pillow block bearings 8 and 9, respectively. The bearings 8 and 9 are mounted on the ends of a frame indicated generally at 10, which includes a plurality of legs 12 and sides 13 (one shown) supported by the legs.

During travel over the top of the pulleys 3 and 4, the belt 1 is supported by transition slides 14 and troughing slides 15. When passing beneath the pulleys 3 and 4 the belt is supported by return slides 17. Each of the transition and troughing slides 14 and 15 includes a frame defined by a tubular base 18 with plates 19 on the ends thereof for mounting the assembly on the main frame 10 of the conveyor. The top ends of vertical center posts 21 extending upwardly from the middle of the base 18 are interconnected by a crossbar 22.

A wear pad 24 in accordance with the present invention is mounted on the crossbar 22. Inclined wear pads 25 are mounted on arms 26 connected to and extending outwardly and upwardly from the ends of the crossbar 22. Inclined side posts 28 extend between the base 18 and the arms 26 for supporting the latter. The basic difference between the transition and troughing slide assemblies 14 and 15 is the angle of the inclined wear pads 25 with respect to the horizontal. The troughing wear pads and the supporting arms 26 have a greater inclination for forming a deep material conveying trough. The wear pads 24 and 25, which are formed of a Teflon (trade-mark for polytetrafluoroethylene) composite, are similar to the pads disclosed by U.S. Pat. No. 6,854,592, issued Feb. 15, 2005.

The pad 24 can optionally include cylindrical or frusto-conical wear indicators of the types described in applicant's Canadian Patent Application 2,327,646 and U.S. Pat. No. 6,854,593, respectively and which are incorporated herein by reference.

Referring to FIGS. 2 to 6, the wear pad 24 in accordance with the present invention is basically an elongated rectangular parallelepipedic body with a flat, rectangular bottom surface 29 and a flat rectangular top surface 30 over which the belt 1 slides. The top of the front and rear ends 31 (the leading and trailing ends in the direction of belt travel) of the pad 24 are beveled. Holes 32 in the pad 24 receive bolts 33 for mounting the pad on the crossbar 22. The pad is spaced apart from the crossbar 22 by a pair of spacers 35. The bolts 33 extend through the spacers 35 and the crossbar 22. Nuts 36 are threaded onto the bottom ends of the bolts 33 beneath the crossbar 22.

As mentioned above, when conveying liquid-containing material, e.g. in the food processing industry, liquid tends to accumulate on the wear pads 24. The liquid literally sucks the belt 1 against the pads 24 which can slow down or stop the belt. Drag on the belt by the liquid is reduced by providing a plurality of grooves or channels 38 extending between the leading and trailing edges (in the direction of belt travel) in the top of each pad 24. Liquid landing on the pads 24 is discharged via the grooves 38. While the dimensions of the pad 24 and the grooves 38 are not critical, in a thirty inch long pad, three 0.25 by 0.25 inch grooves 38 spaced slightly over an inch apart in the center of the pad are effective. Of course, additional grooves with different dimensions can be used in the top of the pad 24.

The wear pad 24 can also be mounted on the arms 26 in place of the wear pads 25.

It will be appreciated that while the wear pad of the present invention has been described in a particular environment, i.e. on a specific slide assembly, the wear pad can be used on different endless belt conveyor slides. Moreover, the number of grooves and the dimensions thereof can vary depending upon, inter alia, the belt width and the speed of belt travel over the pads.

Figure 7:
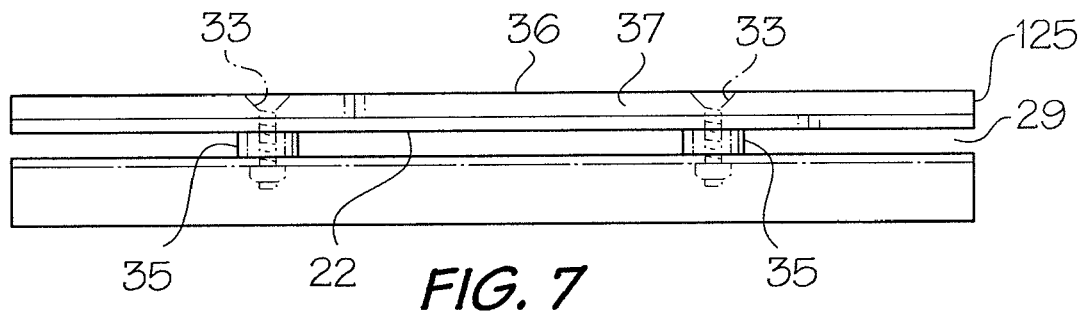
FIG. 7 is a front view of another embodiment of a wear pad in accordance with the invention.
Figure 8:
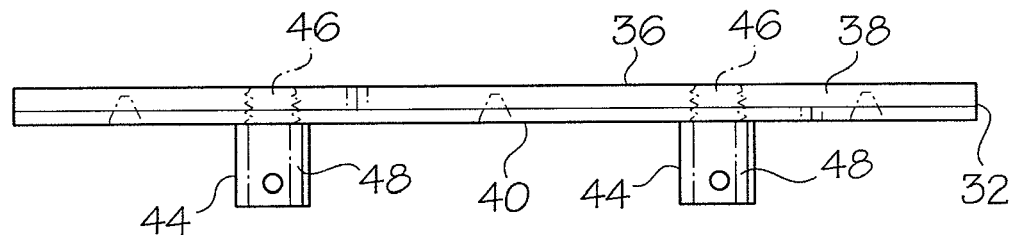
FIG. 8 is a side view of another embodiment of a wear pad in accordance with the invention.
Figure 9:
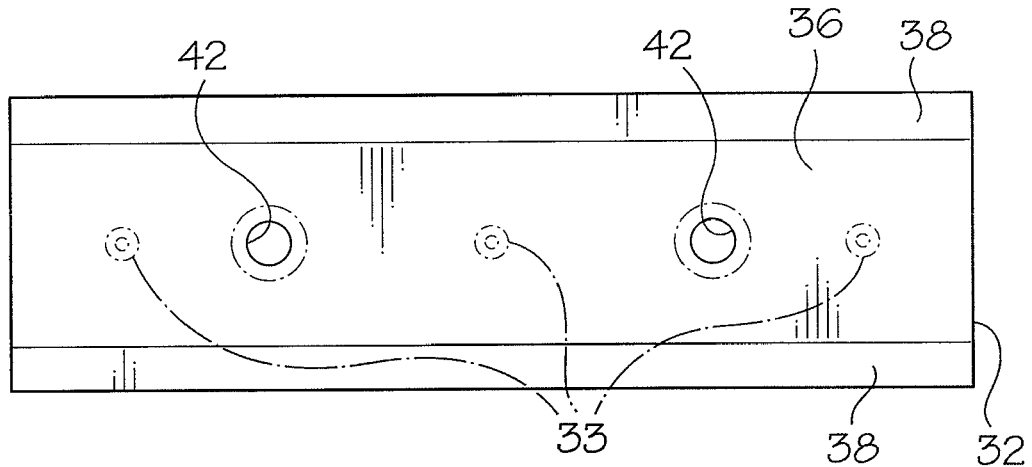
FIG. 9 is a top view of the wear pad of FIG. 8.
Figure 10:
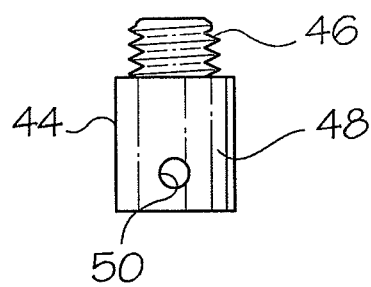
FIG. 10 is a side view of a mounting bolt of the wear pad of FIG. 8.
Figure 11:
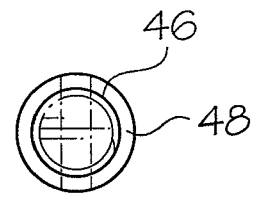
FIG. 11 is a top view of the mounting bolt of FIG. 10.
Figure 12:
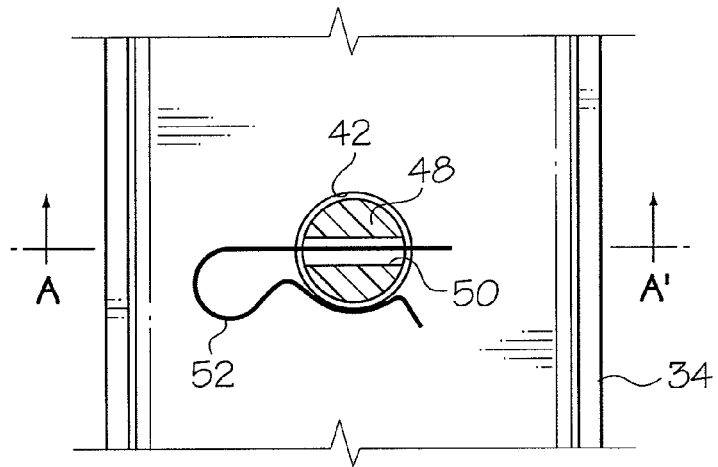
FIG. 12 is a partial section bottom view of a section of a crossbar according to the invention onto which the wearbar of FIG. 8 can be mounted.
Figure 13:
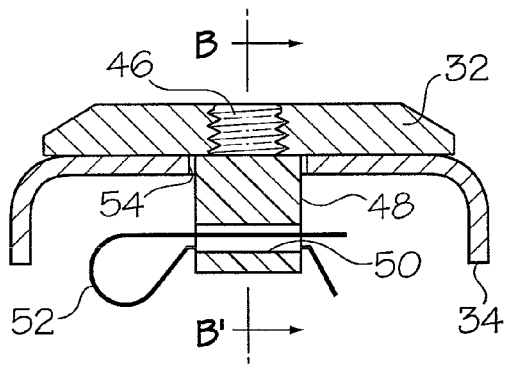
FIG. 13 is a partial section view taken along line A-A' of FIG. 12.
Figure 14:
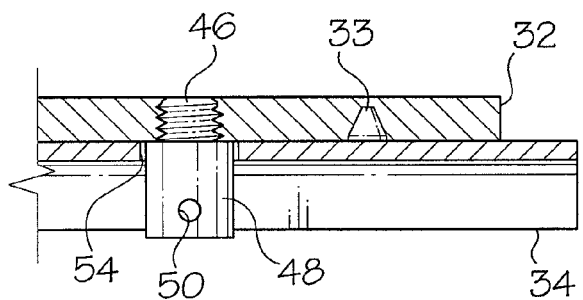
FIG. 14 is a partial-section view taken along line B-B' of FIG. 13.
Figure 15:
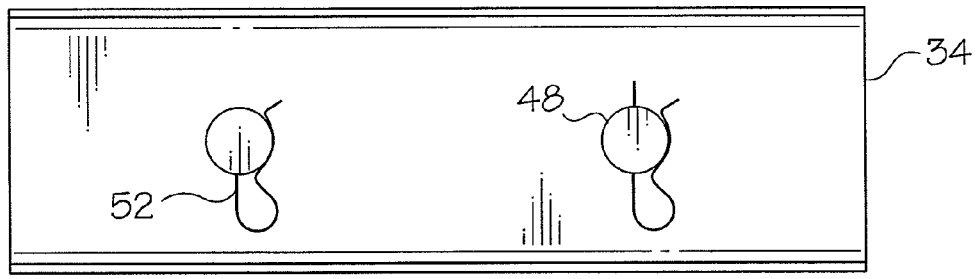
FIG. 15 is a bottom view of the crossbar of FIG. 13.

Referring to FIG. 7, in another embodiment, a wear pad 125, in accordance with the present invention, does not include grooves but otherwise has all of the same elements as wear pad 24 shown in FIGS. 3 to 6 and described above and can be used in place of wear pad 24 on conveyor assemblies of the type shown in FIG. 1 and described herein.

Referring to FIGS. 8 to 14, in another embodiment, wear pad 32 and crossbar 34 can be used in place of wear pads 24 and 25 and crossbar 22 and arm 26 respectively in a conveyor assembly of the type shown in FIG. 1 and described herein.

The wear pad 32 has a rectangular main top surface 36 which contacts the belt 4. The top side edges 38 of the wear pad 32 are bevelled while the bottom surface 40 is rectangular. Two threaded holes 42 are provided in the wear pad 32 for receiving a bolt 44. The bolt 44 is made from Teflon suitable for use in the food industry. The bolt 44 includes a threaded section 46 and a cylindrical head 46. The base 48 includes a bore 50 therethrough for receiving a cotter pin 52.

The wear pad 32 can optionally include cylindrical or frusto-conical (indicated by 33) wear indicators of the types described in applicant's Canadian patent no. 2,327,646 and U.S. Pat. No. 6,854,593 respectively and which are incorporated herein by reference.

The crossbar 34 is made from steel and is generally c-shaped in cross section and includes two holes 54 (one toward each end of the crossbar 34 in a similar fashion to holes 30 in crossbar 10) for receiving bolts 44.

To mount the wear pad 32, a bolt 44 is screwed into each threaded hole 42.

The wear pad 32 is then mounted on the crossbar 34 by dropping the base 48 of the bolts 44 into the holes 54. A cotter pin 52 inserted into each bore 50 prevents the wear pad 32 from being removed from the crossbar 34.

Figure 16:
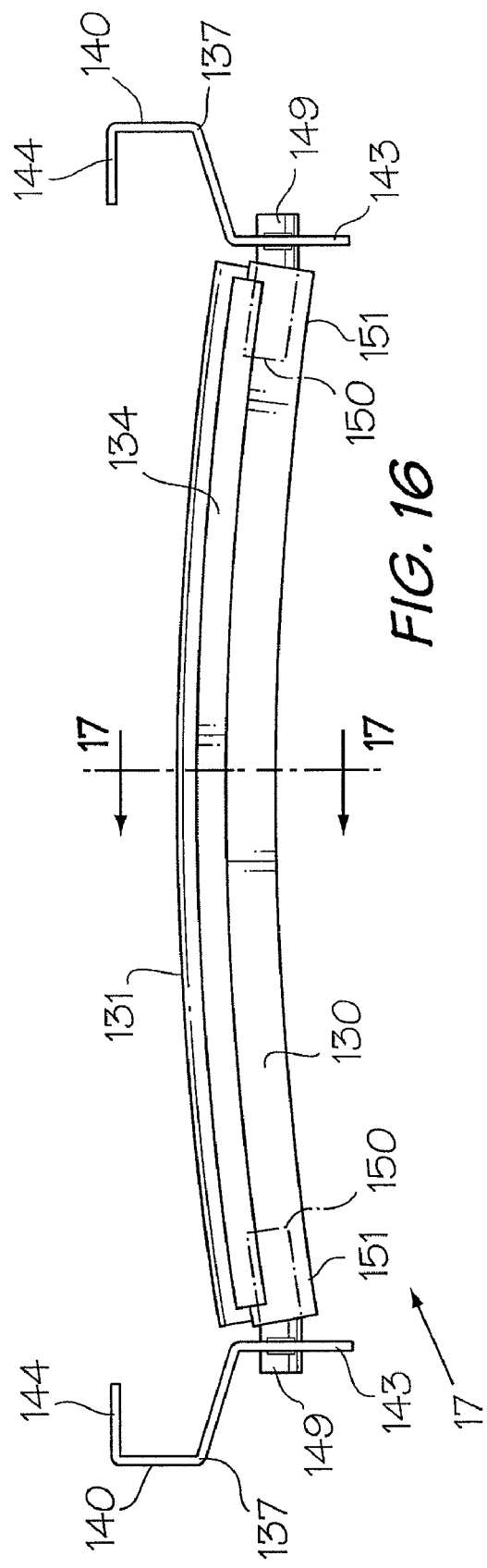
FIG. 16 is a front view of a return slide in accordance with the invention and used in the conveyor of FIG. 1.
Figure 17:
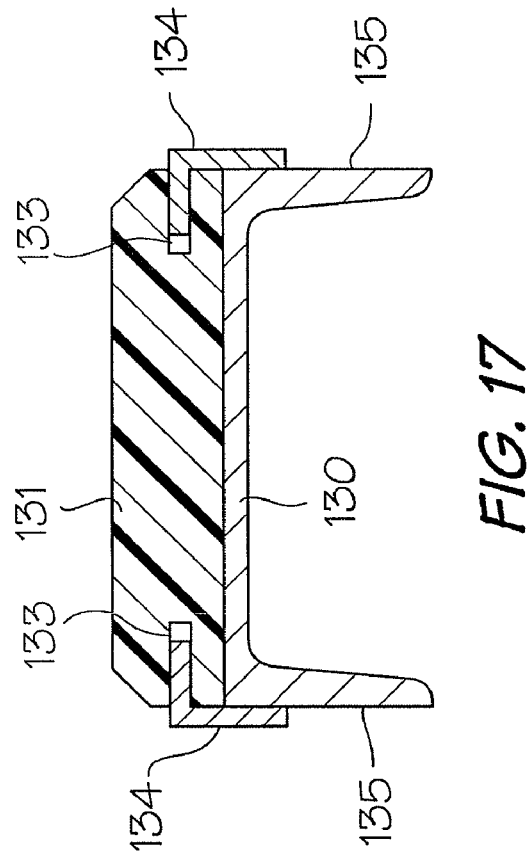
FIG. 17 is a cross section taken generally along line 17-17 of FIG. 16.

With reference to FIGS. 16 and 17, return slides 17 in accordance with the invention, can be used with a conveyor assembly of the type described with reference to FIG. 1. Each return slide 17 includes an elongated steel base 30 having a generally C-shaped cross section. The base 130 is arcuate, i.e. upwardly bowed or convex when viewed from the front or rear. A wear pad 131 mounted on the base 130 is also convex when viewed from the front or rear. Longitudinally extending grooves 133 in the sides of the pad 131 receive inverted L-shaped brackets 134 for retaining the pad on the base 130. The brackets 134 are welded to the sides 135 of the base 130. The use of a return pad 131 with a top surface, which is convex in a direction perpendicular to the direction of travel of the conveyor belt 1 beneath the pulleys 3 and 4 substantially reduces wear on the edges of the belt. It will be appreciated that, when passing around the driven pulley 4, the belt 1 tends to be concave even after the contents of the belt have been dropped. Thus, when it passes beneath the pulley 4, the belt 1 tends to define a shallow, transversely extending inverted trough. The slide 131 accommodates this belt configuration, reducing belt wear. It will also be appreciated that neither the base 130 nor the wear pad 131 need be arcuate. It is merely necessary for the top, belt engaging surface of the pad 131 to be bowed upwardly perpendicular to the path of travel of the belt 1 beneath the pulleys 3 and 4.

Figure 18:
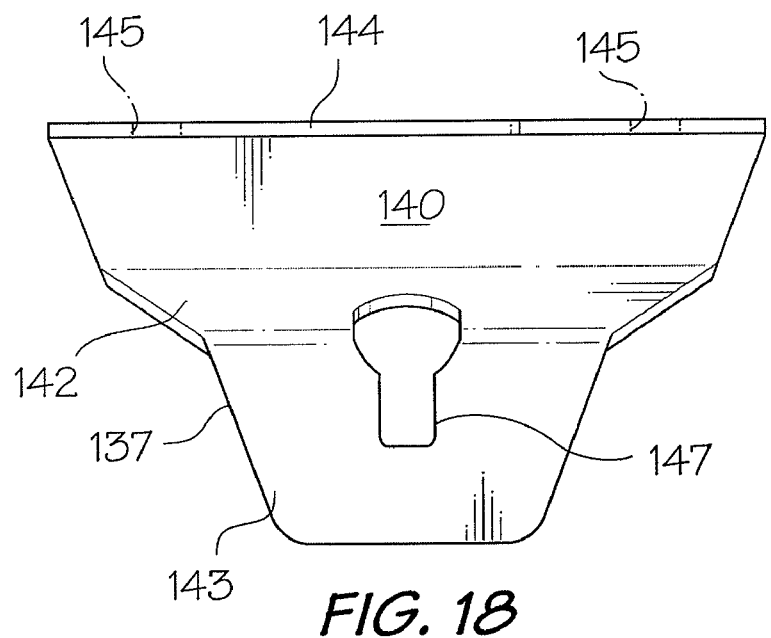
FIG. 18 is a side view of a hanger for mounting the return slide of FIGS. 16 and 17 on a conveyor.
Figure 19:
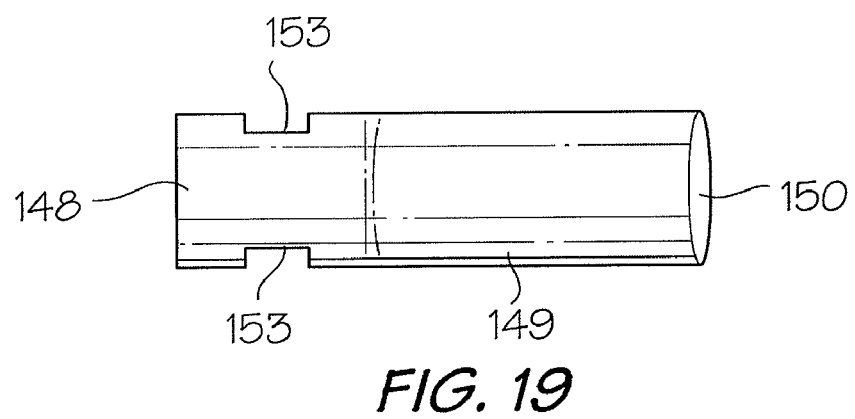
FIG. 19 is a top view of a bar for connecting the hanger of FIG. 18 to a conveyor frame.

The base 130 is suspended from the sides 13 of the conveyor frame 10 by hangers 137. As best shown in FIG. 18, each hanger 137 includes a metal plate which is bent to define a large downwardly tapering, vertical top end 140, a central inclined web 142 and a smaller downwardly tapering bottom end 143. A rectangular flange 144 extends inwardly over the web 142 at the top of the hanger. Holes 145 in the flange 144 receive bolts or screws (not shown) for suspending the hangers from the frame sides 2.

A keyhole slot 147 in the bottom end 143 of the hanger receives one end 148 of a short bar 149, the other end 150 of which supports one end 151 of the slide base 130. In the use position, the outer end 148 of the bar 149 is horizontal, and the inner end 150 is inclined slightly upwardly to match the slope of the base 130. The outer end 148 of the bar 149 includes diametrically opposed flats, i.e. notches 153 for locking the bar in the slot 146.

Figure 20:
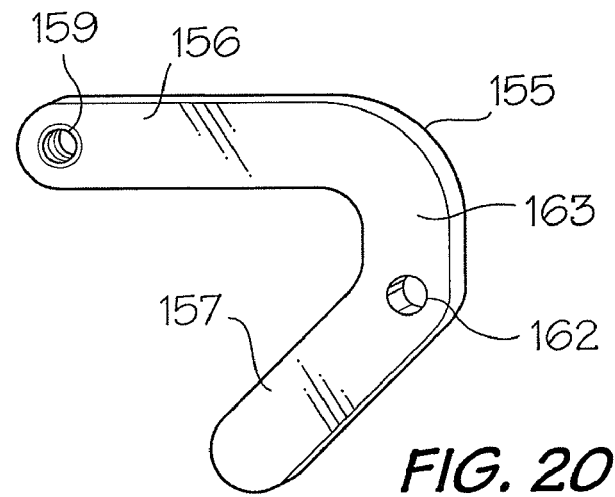
FIG. 20 is an isometric view of a clip for retaining the ends of the return slide in the hanger of FIGS. 18 and 19.
Figure 21:
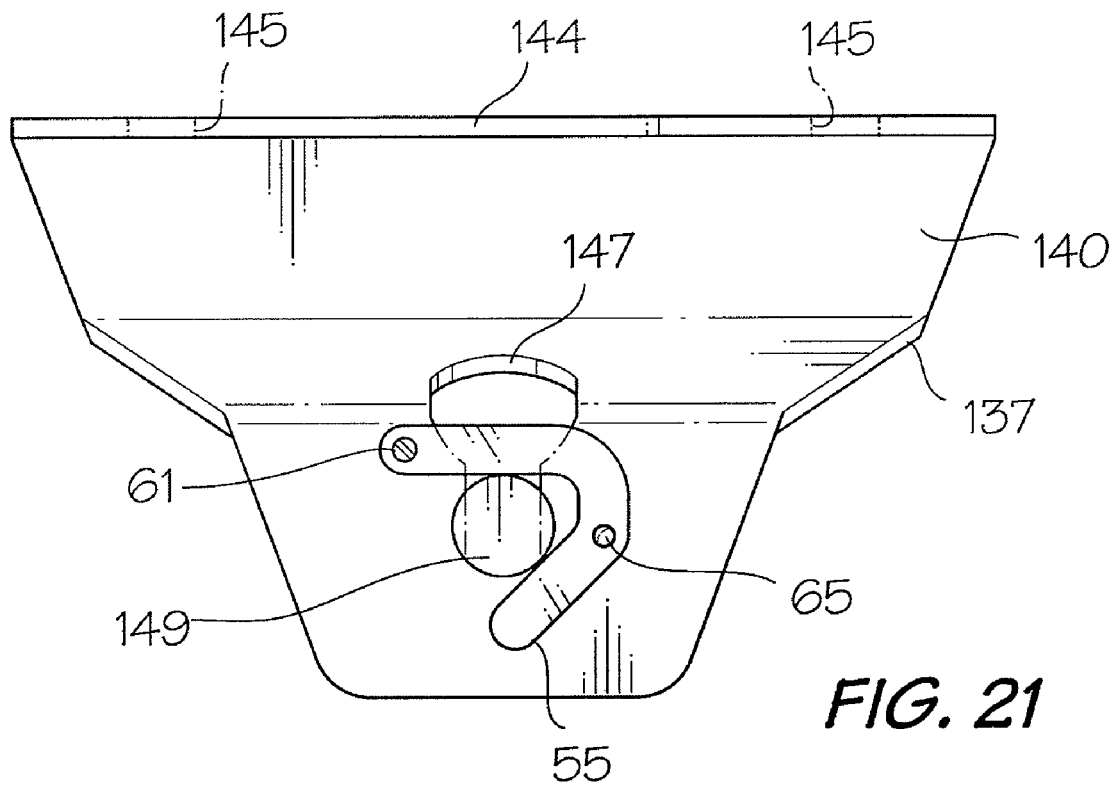
FIG. 21 is a side view of the hanger of FIG. 18 with the clip of FIG. 20 in the use position.
Figure 22:
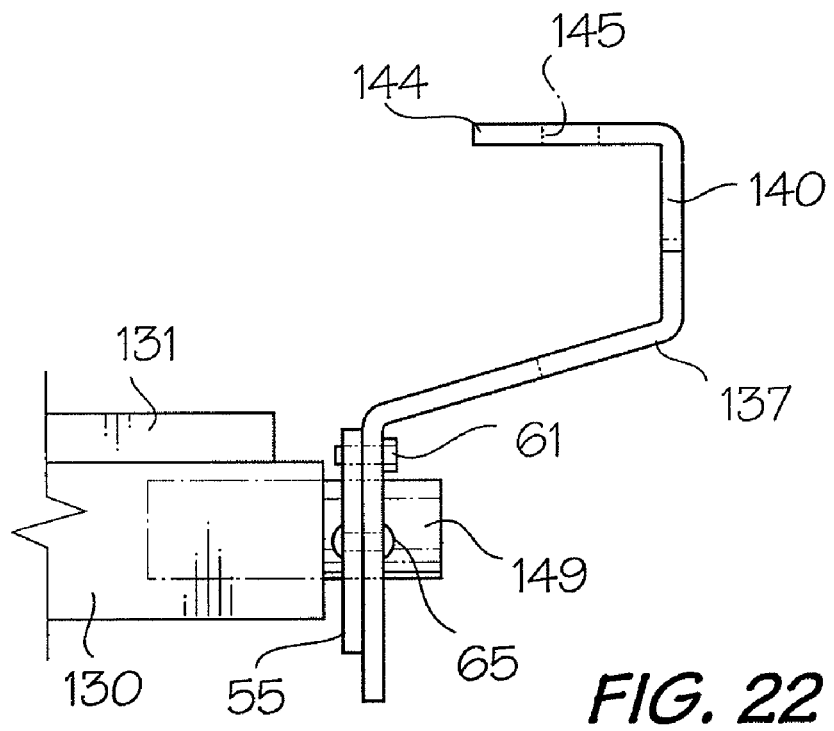
FIG. 22 is an end view of the clip and hanger of FIG. 21.

Referring to FIG. 20, a novel clip 55 for locking the hanger 137 on the bar 149 includes a generally C or boomerang-shaped thin metal body with a horizontal top arm 56 and an inclined bottom arm 57. A threaded hole 59 in the top arm 56 receives a screw 61, and a hole 62 in the arm 57 at the bottom of the vertical corner 63 of the body receives a rivet 65. When the bar 149 is in the narrow bottom of the keyhole slot 147 and the clip 55 is in position with the top arm 56 extending over the bar, the bar 149 is locked in position and cannot escape from the hanger. When the conveyor is being transported from one location to another, the return slide can be dislodged from the hangers 137, i.e. the bar 148 can bounce out of the slot 147 in the hanger. The clip 55 prevents such accidental release of the slide.

If the return slide or a portion thereof is to be replaced, the slide can be removed from the hangers 137 by removing the screws 61 and lifting the slide. The bars 149 cause the clips 55 to pivot around the rivets 65 to release the slide. The rivets 65 are long enough to permit the clip to rotate, but sufficiently short that when rotated by the bars 149 the bottom arm 57 of the clip remains in position covering the bottom end of the keyhole slot 147. When the bars 149 are inserted in the slots 147 and lowered, the bars engage the arms 57 to cause the clips to rotate to the bar locking positions. The screws 61 are replaced in the holes 59 to lock the return slide in the hangers 137.

It will be appreciated by those skilled in the art to which the present invention relates that the clip 55 can be used with hangers for suspending straight return slides or even roller assemblies from a conveyor frame.

The invention claimed is:

1. A hanger assembly used for suspending a return slide from an endless belt conveyor frame comprising a hanger plate having a top end for suspending the hanger from the conveyor frame; a bottom end for supporting one end of a return slide; a keyhole slot in said bottom end for receiving a bar for connecting the hanger plate to one end of a return slide; and a clip for locking said bar in said slot;

wherein said bar includes an inner end for supporting one end of said return slide; an outer end for extending through said keyhole slot in the hanger plate; and opposed grooves in said outer end for securing the bar in said slot; and wherein said clip is generally C-shaped including a horizontal top arm for straddling said out end of said bar and a lower arm, whereby, when the clip is placed on the bar and secured to said hanger plate, the bar is locked in said keyhole slot by said top arm of the clip.

2. The hanger assembly of claim 1, wherein the clip is pivotally connected to said hanger plate for rotation between a closed position in which said top arm straddles said bar and an open position in which the lower arm covers a bottom end of said keyhole slot.

3. The hanger assembly of claim 1, including a flange on said top end of the plate for connecting the hanger to the conveyor frame; and an inclined web connecting said top end to said bottom end of the plate.

* * * * *